Figure 1:
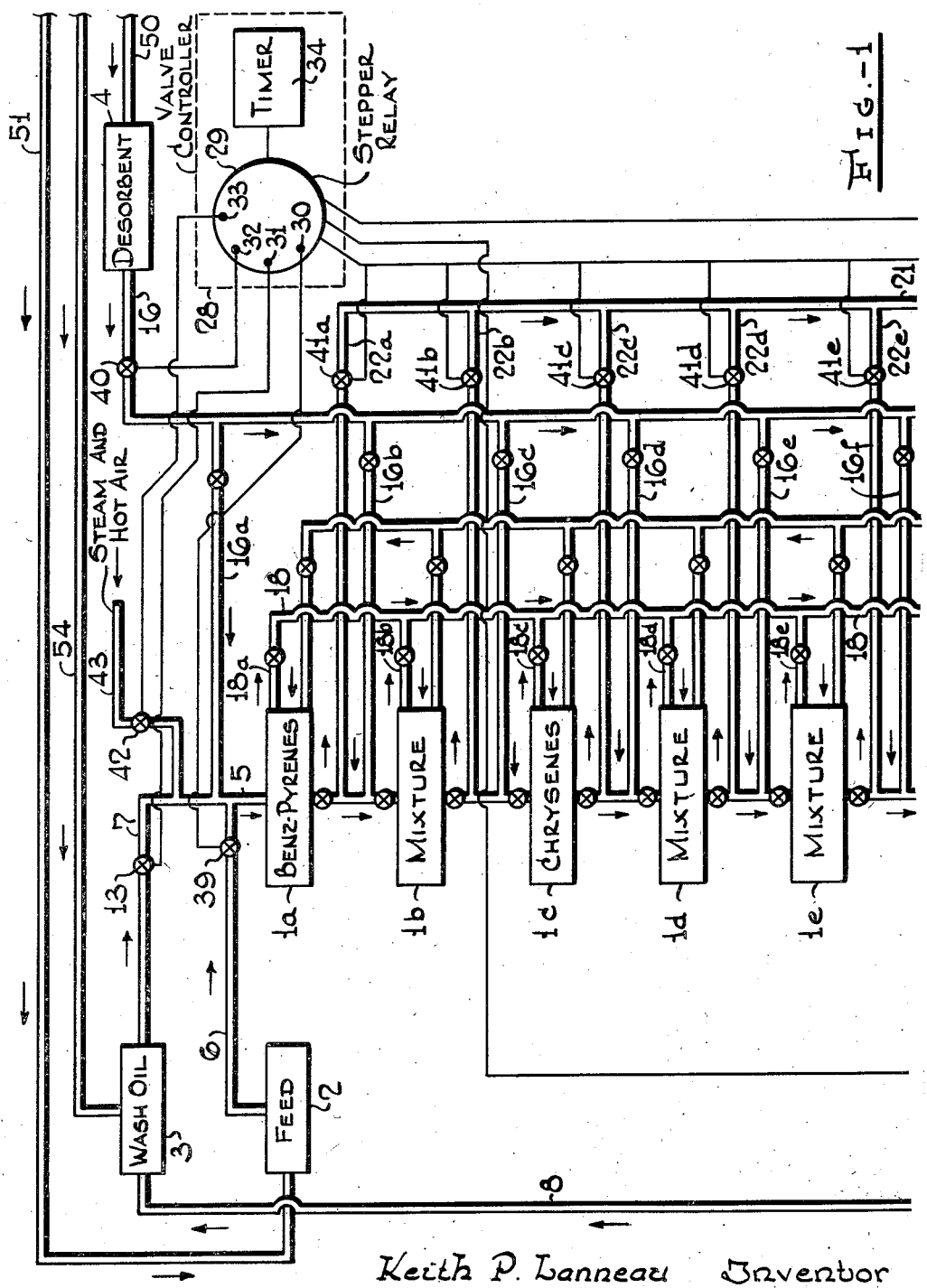
Figure 2:
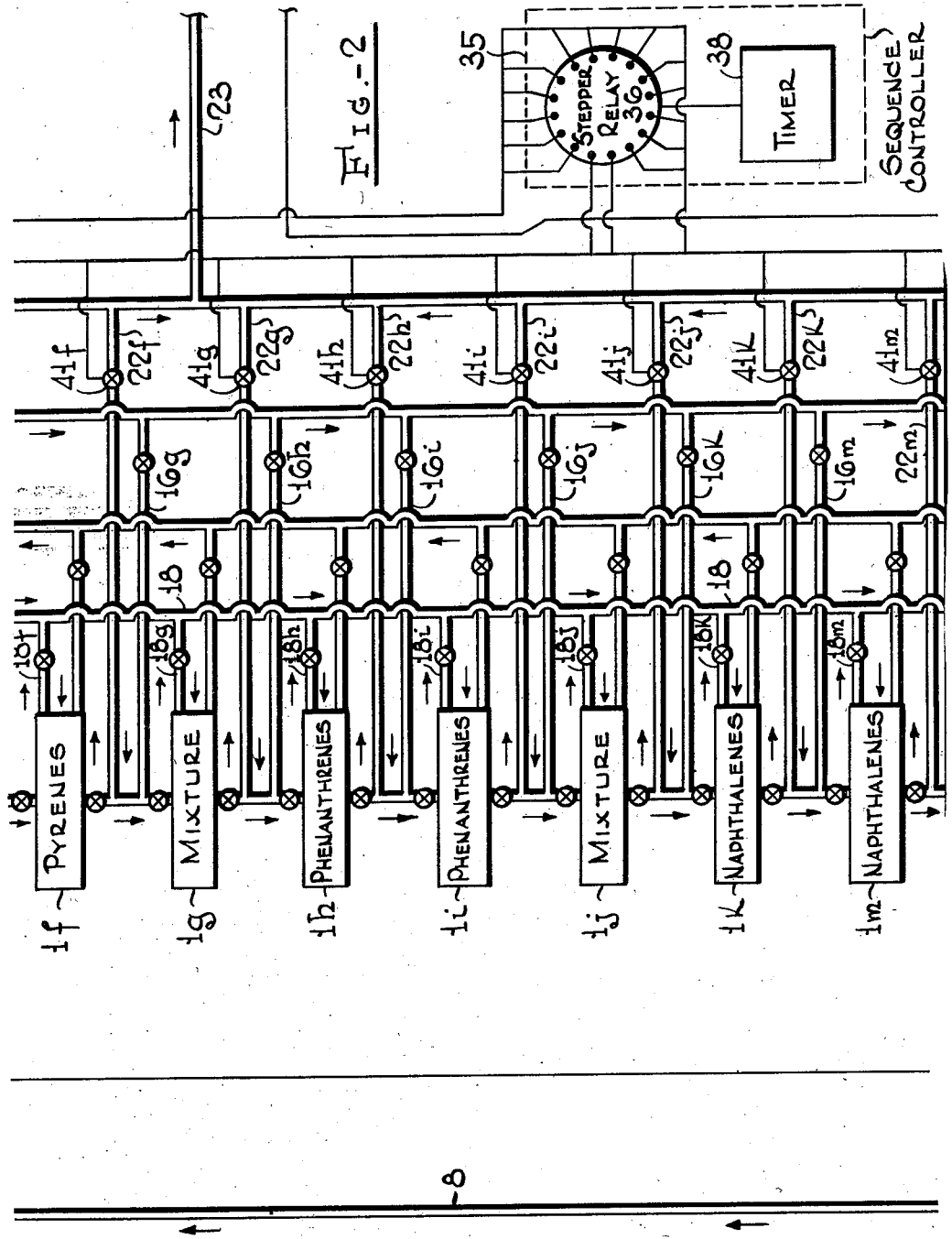
Figure 3:
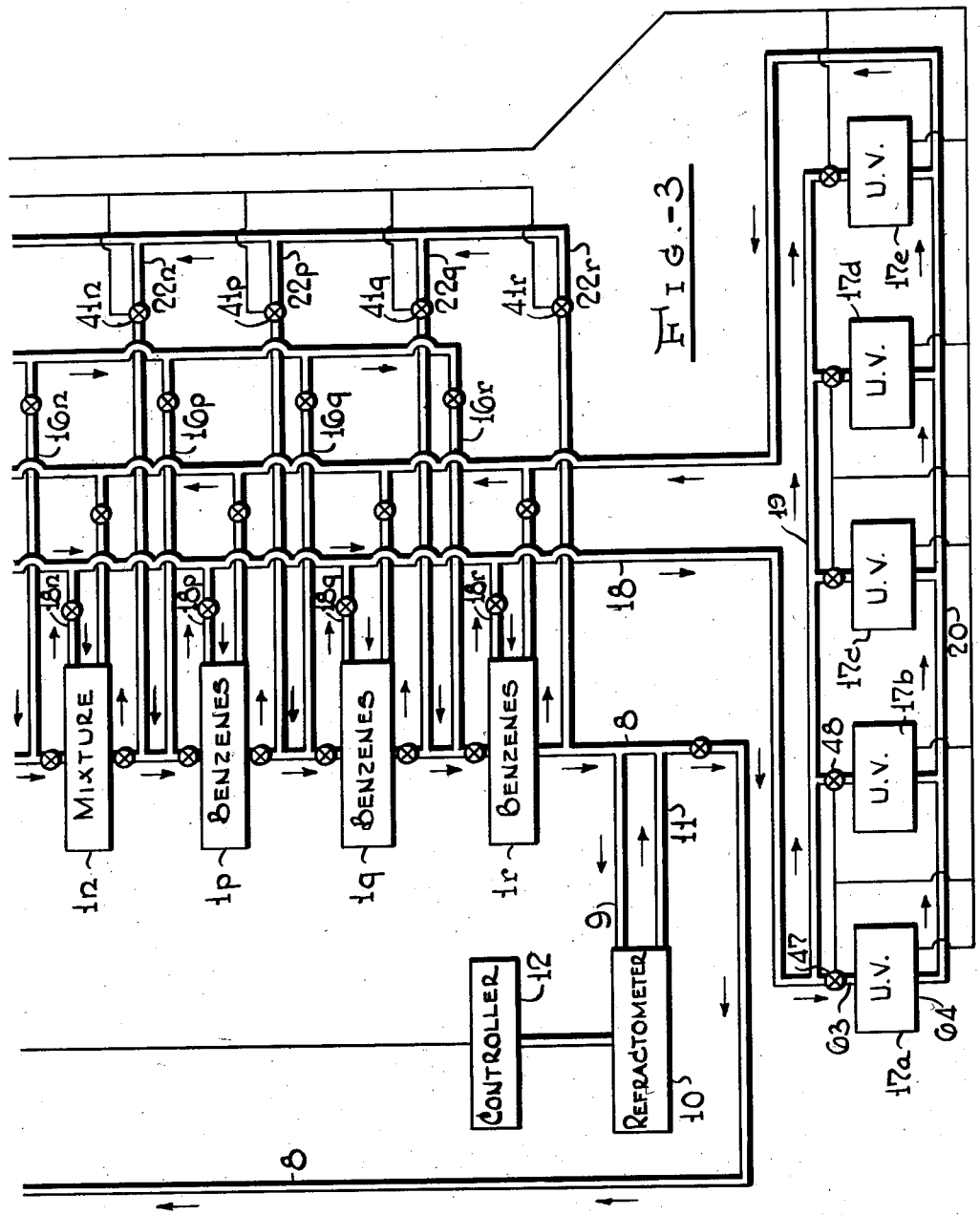
Figure 4:
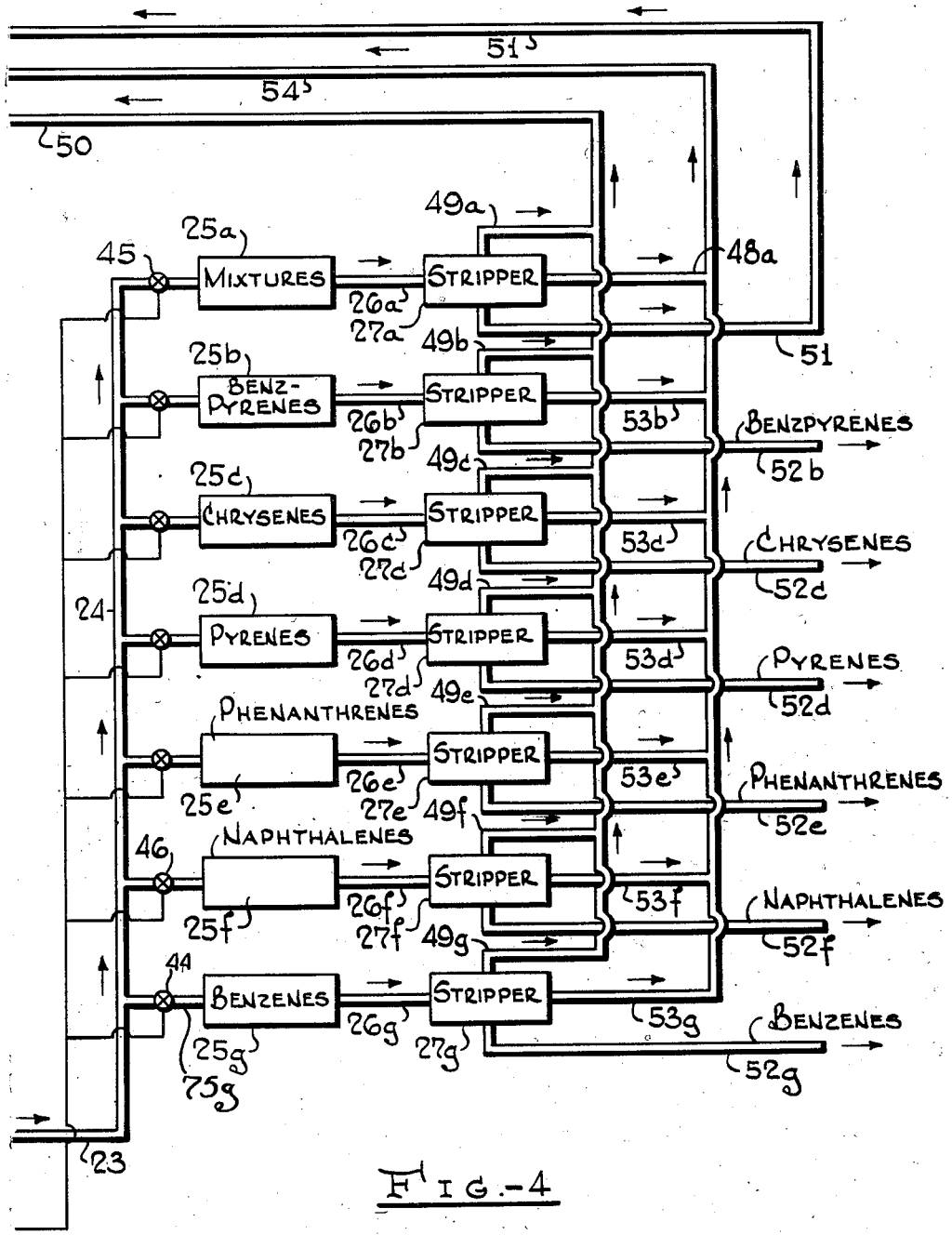

April 23, 1957 K. P. LANNEAU 2,790,016
METHOD FOR SEGREGATING AROMATIC HYDROCARBONS
Filed Feb. 1, 1952 5 Sheets-Sheet 1

Keith P. Lanneau Inventor
By W. O. J. Heilman Attorney

April 23, 1957 K. P. LANNEAU 2,790,016
METHOD FOR SEGREGATING AROMATIC HYDROCARBONS
Filed Feb. 1, 1952 5 Sheets-Sheet 5

Keith P. Lanneau Inventor
By W. D. Hulman Attorney

United States Patent Office 2,790,016
Patented Apr. 23, 1957

2,790,016

METHOD FOR SEGREGATING AROMATIC HYDROCARBONS

Keith P. Lanneau, Baton Rouge, La., assignor to Esso Research and Engineering Company, a corporation of Delaware Application February 1, 1952, Serial No. 269,549

1 Claim. (Cl. 260—674)

This invention relates to a method of segregating aromatic hydrocarbons and more particularly relates to a method of segregating polynuclear hydrocarbons in a relatively pure state.

It has been recognized for some time that a hydrocarbon mixture may be selectively separated into specific fractions, containing a predominant proportion of components belonging to the same hydrocarbon class by passing the original hydrocarbon mixture through a mass of silica particles and thereafter desorbing the hydrocarbons adsorbed by the silica with a suitable liquid desorbent. According to these observations, the mass of silica particles forming the adsorbent bed have adsorbed thereon, in each successive strata, hydrocarbons belonging to a particular class. By displacing or desorbing the hydrocarbons adsorbed on the silica particles in each of said strata successively in the order in which said strata occur in the bed of adsorbent, it is possible to effect thereby a separation or classification of the components of the original mixture into their respective hydrocarbon classes.

The above separation, as known and practiced by the prior art, is usually conducted by introducing the original hydrocarbon mixture to be separated into the top of a fixed bed of silica gel particles, allowing the liquid hydrocarbons to percolate downwardly through the column of silica adsorbent, thereafter introducing a selected desorbing liquid into the column, allowing the same to flow downwardly through the column to displace the adsorbed hydrocarbons and finally collecting said desorbed hydrocarbons from the bottom of the column in the order of their displacement from the adsorbent. When the respective adsorption and desorption stages of the process are operated in the above designated manner, that is, by introducing both the hydrocarbon mixture to be separated and the subsequent desorbing fluid into the top of the adsorption column and allowing them to flow downwardly, it is found that the aromatic components which are preferentially adsorbed by the silica are retained by the uppermost layer of silica particles in the adsorption column. It is also observed that in the desorption phase of the separation process the aromatic components of the charge comprise the last fraction to issue from the adsorption column. This result is believed to depend upon the selective adsorption of said aromatic hydrocarbons by silica, their preferential retention on the adsorbent silica as compared to the retention of other classes of hydrocarbons, and, consequently, the displacement of said other hydrocarbon classes by the aromatics when the desorbent is introduced into the column in the desorption stage. Depending upon the same preferential order of adsorption, the olefinic components, adsorbed on the silica particles immediately below the strata of particles occupied by the aromatic components, when desorbed, displace the naphthenes adsorbed on the strata of adsorbent below that strata occupied by the olefins. Paraffinic hydrocarbons, when present in the original hydrocarbon mixture treated in the adsorption column, are least preferentially adsorbed by the silica and these components therefore accumulate in the lowest strata of silica particles in the adsorbent bed. Likewise, they are the first components to leave the bottom of the adsorption column when the desorbent liquid enters the top of the column, since all other classes of hydrocarbons are capable of displacing the paraffins from the adsorbent. Following the paraffinic hydrocarbons, the naphthenes are next to issue from the adsorption column during the desorption stage and these are followed successively by the olefinic and aromatic components. The paraffinic and naphthenic components, both of which are of saturated structure, are adsorbed by silica with approximately the same degree of preference or selectivity so that unless both the adsorption and desorption stages are conducted with extreme care and precision, there is relatively little separation of these hydrocarbon types. However, the slight difference in adsorptivity between the latter two classes permits a more thorough separation if the mixture is passed through successive adsorption towers in series.

According to the disclosure of copending application Serial No. 225,542, filed May 10, 1951, now abandoned, the same principle can be used to segregate the various polynuclear aromatic hydrocarbons provided the feed is substantially free of non-aromatics. The preliminary step of removing the non-aromatics can be accomplished in several ways, for example, by percolation through silica gel or by phenol extraction. The aromatic material is then separated into fractions according to the number of condensed rings by percolation through alumina gel.

It has been found, however, that the individual fractions are not obtained in as pure a state as is often desired because of the fact that during the desorption the individually segregated fractions become mixed to some extent as they flow from the bottom of the column.

It is, therefore, the main object of this invention to provide a method whereby the segregated fractions can be individually desorbed from the adsorbent.

It is a further object of the invention to provide a continuous and automatic method for controlling the desorption of each segregated fraction.

Further objects of the present invention will be apparent to those skilled in the art from the following description taken in connection with the accompanying drawings wherein:

Figures 1, 2, 3 and 4 together are a schematic diagram of one method for carrying out this invention.

Figure 5:
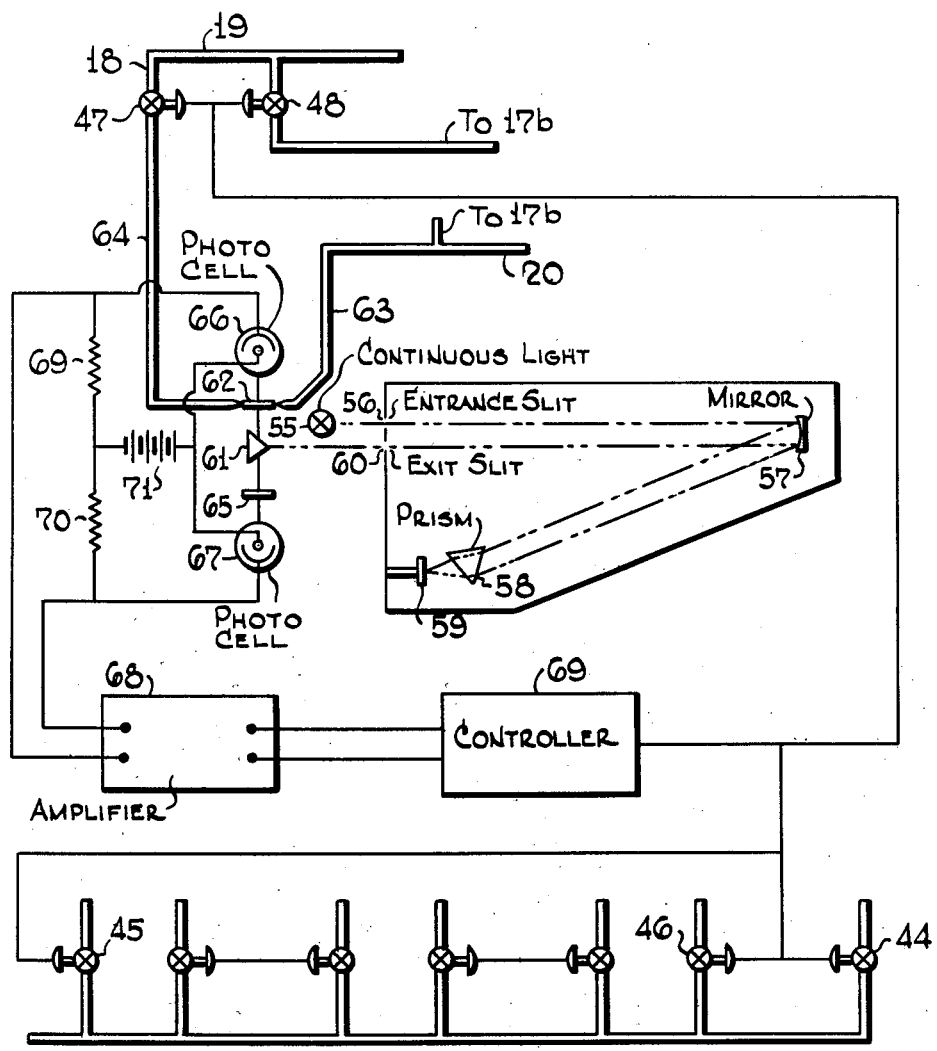

Figure 5 represents a suitable type of ultra violet analysis apparatus used in connection with Figure 1.

In accordance with this invention, a mixture of aromatic hydrocarbons, essentially free of non-aromatic hydrocarbons, is percolated through a plurality of serially-arranged beds of alumina gel. The aromatic constituents are resolved according to number of condensed nuclei (rings) by passing a washing liquid serially through each bed. The completion of this resolution can be easily determined automatically by means of the refractive index. In this manner the more condensed aromatics will concentrate in the first beds in the series in decreasing order of number of nuclei with the benzene aromatics being concentrated in the last bed. Greater resolution can be obtained by increasing the number of beds. The hydrocarbons in each bed are then segregated by passing a desorbing liquid through each bed separately in reverse order in which they were adsorbed and collecting the effluent in an appropriate collecting vessel or tank. In this manner an aromatic feed might be separated into the following types:

1. Benzenes

2. Naphthalenes

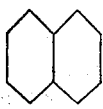

3. Phenanthrenes

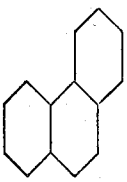

4. Pyrenes

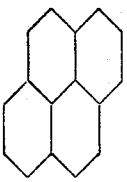

5. Chrysenes, benzphenanthrenes, and benzanthracenes

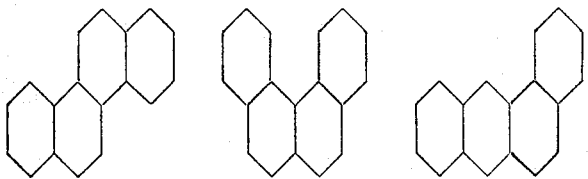

6. Benzpyrenes (including sulfur and oxygen compounds)

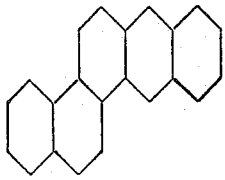

The present invention is based on the discovery that the concentration of the specific types of aromatics referred to above can be determined by measuring the ultra violet light absorption of the desorbate at particular wave lengths. In a given series of beds, there will be certain beds which will contain an overlapping mixture of two of the types being segregated. Other beds will contain substantially pure types. The greater the number of beds, the purer these types will be. The concentrations of the overlapping aromatic types in binary mixtures can be determined approximately by ultra violet measurements at particular wave lengths as follows:

|   | Millimicrons |
|---|---|
| 1. Benzenes / Naphthalenes | 228 |
| 2. Naphthalenes / Phenanthrenes | 254 |
| 3. Phenanthrenes / Pyrenes | 245 |
| 4. Pyrenes / Chrysenes, etc. | 270 |
| 5. Chrysenes, etc. / Benzpyrenes | 290 |

According to the present invention, there is provided a separate analyzer for each of the above mixed types. Each bed is sampled by one of these five analyzers, the precise analyzer used depending upon the composition of the mixture. Since the lighter components collect in the lowest beds, the desorption appropriately begins at the bottom and proceeds from bed to bed up the column. The desorbate from the bottom bed passes to the first analyzer, which is set for absorption at 228 mmu. As higher beds are passed to this analyzer, the absorption at 228 mmu will increase because of the gradualy increasing presence of naphthalenes. When the absorption reaches a value indicating the maximum tolerable naphthalene-contamination of the benzene fractions, the analyzer actuates a recorder controller which diverts the desorbate of succeeding beds into a recycle desorbate storage tank. These higher beds continue to be analyzed by the first analyzer until absorption at 228 mmu reaches a high enough value to indicate substantially pure naphthalene containing no more than the tolerable amount of benzene contamination. The succeeding higher beds are then diverted to the naphthalene desorbate storage tank and are analyzed by the next analyzer set for absorption at 254 mmu. This method of operation continues through the remainder of the beds.

The amount of adjacent material which can be tolerated in a given fraction depends upon its subsequent use and may range, for example, from 1 to 10%, but this may vary below 1% to as low as 0.1% or less if extremely pure material is desired and the number of beds is large enough to permit such resolution. Similarly, the amount of contaminating material may exceed 10% if only rough cuts are desired.

Referring now to Figures 1–4, there is shown in schematic form a typical apparatus employing the novel features of this invention. In this drawing, numerals 1a, 1b, 1c, 1d, 1e, 1f, 1g, 1h, 1i, 1j, 1k, 1m, 1n, 1p, 1q, 1r represent a series of connected adsorption vessels or beds packed with alumina gel. Connected to the vessel 1a are supply tanks 2, 3, and 4 through lines 5 and 6, 5 and 7, and 5, 16a, and 16 respectively. Vessel 1r is connected through line 8 to supply tank 3. Vessel 1r is also connected through lines 8, 9 and 11 to refractometer 10 and controller 12. Each of the vessels 1a . . . 1r are connected to manifold 16 through individual connecting lines 16a . . . 16r. In addition, beds 1a . . . 1r are connected by individual connecting lines 18a . . . 18r respectively to manifold 18, which, in turn, is connected to manifolds 19 and 20. Connected in parallel between manifolds 19 and 20 are ultraviolet absorption units 17a, 17b, 17c, 17d, 17e. Beds 1a . . . 1r are also connected to manifold 21 through individual connecting lines 22a . . . 22r. Manifold 21 is connected by line 23 to manifold 24, which, in turn, is connected to tanks 25a . . . 25g. Each of these tanks is connected by lines 26a . . . 26g to strippers 27a . . . 27g respectively.

The various valves controlling flow from each of the beds into the various lines of the process are automatically opened and closed by a very closely knit control system. This control system is divided into four major units. The first is the valve control unit 28. This unit consists of a conventional stepper relay 29 having four points of contacts, 30, 31, 32, and 33. The stepper relay is controlled by means of a conventional clock relay or timer 34. This clock relay allows a specified time to pass before it actuates the stepper and causes it to jump from one point to another. The second control unit is the sequence controller 35. This controller is similar to that of the valve controller 28 and likewise contains a stepper relay 36 having 16 points of contact 37 and timer 38. The third control system comprises ultra violet analyzers 17 and controllers 64 as shown in detail in Figure 3, while the fourth comprises the refractometer 10 and controller 12.

The stepper relays, clock relays, and recorder-controllers are all of conventional types obtainable from any number of manufacturers. The stepper relays and controllers open and close the appropriate valves (solenoids or pneumatics controlled by solenoids). The two clock relays are started by the steppers, while the steppers are in turn stepped by the clock relays after predetermined periods.

At the commencement of the process, stepper 29 is set at point 30 whereupon valve 39 is opened to permit feed to flow from tank 2 by lines 5 and 6 through beds 1a . . . 1r. After a certain specified time has passed, timer 34 actuates stepper relay 29 and causes it to jump to point 31, which, in turn, causes valve 39 to close and valve 13 to open, allowing wash oil to flow from tank 3 by lines 7 and 5 through beds 1a . . . 1r. Wash oil is withdrawn from the bottom of bed 1r through line 8 and recycled to tank 3. A portion of the wash oil is passed by line 9 through refractometer 10, returning to line 8 through line 11. When the refractive index of the effluent from bed 1r indicates that benzene is contained therein, controller 12 causes stepper relay 29 to jump to point 32, causing valve 13 to close and valve 40 to open, allowing desorbent from tank 4 to flow through manifold 16. At this point, by a signal from stepper relay 29, sequence controller 35 is brought into operation by the actuation of timer 38, which actuates stepper relay 36 and causes valves 41r . . . 41a to be opened and closed serially in that order in a definite time sequence, allowing each of the vessels 1r . . . 1a to be desorbed in that order. When the sequence controller 35 has allowed desorption of the last bed 1a to be completed, it then reactuates the valve control unit 28, causing stepper relay 29 to step into point 33 and open valve 42 for the introduction of steam and hot air through line 43, whereupon regeneration of the beds is accomplished.

At the beginning of the desorption, a portion of the desorbate from bed 1r is passed by line 18r into manifold 18 and thence into ultra violet analyzer 17a, where it is subjected to ultra violet radiation of 228 mmu. At the same time the remainder of the desorbate from 1r is passed through lines 8 and 22r to manifold 21, line 23 and manifold 24. Initially, all material from beds 1r, 1q, etc., are passed from manifold 24 through line 75g into benzene storage tank 25g. However, when the ultra violet absorption of the desorbate from bed 1r, 1q, etc., reaches a value which indicates that a maximum tolerable amount of naphthalene is present, the analyzer 17a actuates recorder controller 64 which closes valve 44 and opens valve 45, diverting the desorbate of succeeding beds into recycle desorbate storage tank 25a. Succeeding beds will continue to be sampled by analyzer 17a until the absorption at 228 mmu reaches a high enough value to indicate that substantially pure naphthalene containing no more than tolerable amounts of benzene is being desorbed. When this point is reached, controller 64 in the ultra violet analyzer 17a operates to close valve 45 and open valve 46 and thus divert desorbate from succeeding beds to naphthalene desorbate storage tank 25f. At the same time the controller in analyzer 17a operates to close valve 47 and open valve 48, whereby succeeding desorbate is analyzed by analyzer 17b. This cycle of operations continues through the remainder of the beds.

To recapitulate, the first cuts are sampled by analyzer 17a, pure benzene desorbate being passed to tank 25g, while benzene-naphthalene mixtures are passed to recycle tank 25a. Pure naphthalene desorbate is passed to tank 25f. Succeeding desorbate is sampled by analyzer 17b and pure naphthalene desorbate continues to pass to tank 25f. Naphthalene-phenanthrene mixtures are passed to recycle tank 25a. Pure phenanthrene desorbate is passed to tank 25e. Subsequent desorbate is then sampled by analyzer 17c. Pure phenanthrene desorbate continues to pass to tank 25e. Phenanthrene-pyrene mixtures are passed to tank 25a. Pure pyrene desorbate is passed to tank 25d. Succeeding desorbate is then sampled by analyzer 17d. Pure pyrene desorbate continues to pass to tank 25d. Pyrene-chrysene mixtures are passed to recycle tank 25a. Pure chrysenes are passed to tank 25c. Subsequent desorbate is then sampled by analyzer 17e. Pure chrysenes continue to pass to tank 25c. Chrysene-benzpyrene mixtures are passed to tank 25a. Pure benzpyrenes and sulfur and oxygenated compounds are passed to tank 25b.

From the above analysis it is clear that each analyzer has two points at which it actuates its accompanying controller. The first point limits the contamination of a component by the next higher component in the series of beds, and the second actuation point on the analyzer limits the contamination of the upper component by the lower. Between these two points the desorbates must be regarded as mixtures of aromatic types and are thus diverted to recycle.

The fractions collected in tanks 25a . . . 25g are passed by respective lines 26a . . . 26g to respective strippers 27a . . . 27g, where the desorbent is removed overhead through line 49a . . . 49g and recycled to desorbent tank 4 through line 50. Bottoms from stripper 27a are passed by line 51 to feed tank 2 while bottoms from stripper 27b . . . 27g are passed through line 52b . . . 52g to the respective product storage tanks (not shown). If desired, a side stream may be taken from each stripper 27a . . . 27g through lines 48a and 53b . . . 53g and recycled to wash oil tank through line 54.

A typical ultra violet analyzer suitable for uses in this invention is shown in Figure 5. Light from source 55 is passed through entrance slit 56 onto mirror 57, from which it is reflected through prism 58 onto mirror 59, back through prism 58 and mirror 57 and out through exit slit 60. From exit slit 60 the light is impinged on reflecting prism 61 which divides the light into two beams, one of which passes through absorption cell 62, through which the sample of material from the accompanying vessel 1 is passed by lines 63, 64, and the other through a standard cell 65, which may either be empty or contain a standard fluid. Light from absorption cell 62 is impinged on photocell 66 and that from absorption cell 65 on photocell 67. Photocells 66 and 67 are connected in opposition, the difference between the voltages output of these cells being applied to the amplifier 68. Load resistors 69 and 70 are shunted across the two cathode leads of the phototubes. A battery 71 connects the load resistors with the anode circuit. The output of amplifier 68 is recorded by a potentiometer recorder-controller 69 which, in turn, translates the electrical signal into an equivalent pneumatic control, for example, valves 47 and 48.

The nature of the present invention having been thus fully set forth and specific examples of the same given, what is claimed as new and useful and desired to be secured by Letters Patent is:

A process for segregating an aromatic hydrocarbon mixture consisting of benzenes, naphthalenes, phenanthrenes, pyrenes, at least one compound from the class consisting of the condensed 4-ring compounds including chrysenes, benzphenanthrenes, and benzanthracenes, and at least one compound from the class consisting of the condensed 5-ring compounds including benzpyrenes, which comprises percolating said aromatic hydrocarbons through a plurality of beds of alumina gel arranged serially; passing a washing liquid serially through said beds whereby the aromatic hydrocarbons are resolved into the six different types and their adjacent mixtures according to the number of condensed rings per molecule; desorbing each of said beds separately in reverse order from that in which they were adsorbed; providing five beams of ultra violet radiation, one having a wave length of 228 millimicrons, one of 254 millimicrons, one of 245 millimicrons, one of 270 millimicrons, and one of 290 millimicrons; dividing each beam of radiation into two separate beams; passing the initial desorbate to benzene storage; passing one of said separate beams having a wave length of 228 millimicrons through at least a portion of the initial desorbate until the absorption at 228 millimicrons represents the maximum permissible amount of naphthalene present; diverting the stream containing the said naphthalene from the benzene storage and recycling said stream to the feed; continuing to pass said separate beam having a wave length of 228 millimicrons through said mixture desorbate containing naphthalene until the absorption at 228 millimicrons represents naphthalene containing the maximum amount of benzene; then diverting the desorbate from recycle to naphthalene storage; simultaneously passing another of said separate beams having a wave length of 254 millimicrons through the desorbate until the absorption at 254 represents the maximum permissible amount of phenanthrene present; then diverting the desorbate to recycle while continually passing said beam of radiation at 254 millimicrons therethrough until the absorption at 254 represents phenanthrene containing the maximum permissible amount of naphthalene; then diverting the desorbate to phenanthrene storage and simultaneously passing another of such separate beams of radiation having a wave length of 245 millimicrons through the desorbate until the absorption at 245 millimicrons represents the maximum permissible amount of pyrenes present; thereupon diverting said desorbate again to recycle; continuing to pass said radiation having a wave length of 245 millimicrons through said desorbate until the absorption at 245 represents pyrenes containing the maximum permissible amount of phenanthrenes present; thereupon diverting said desorbate to pyrene storage; simultaneously passing a separate beam of radiation having a wave length of 270 millimicrons through said desorbate until the absorption at 270 millimicrons represents the maximum permissible amount of chrysenes present; thereupon diverting said desorbate to recycle; continuing to pass said beam of radiation having a wave length of 270 millimicrons therethrough until the absorption at 270 millimicrons represents chrysenes containing the maximum permissible amount of pyrenes; thereupon diverting the desorbate to chrysene storage and simultaneously passing another separate beam having a wave length of 290 millimicrons through said desorbate until the absorption at 290 represents the maximum permissible amount of benzpyrenes present; thereupon diverting said desorbate to recycle; continuing to pass the beam of radiation having a wave length of 290 millimicrons through the desorbate until the absorption at 290 represents benzpyrenes containing the maximum permissible amount of chrysenes present and thereafter passing the desorbate to pyrenes storage.

References Cited in the file of this patent

UNITED STATES PATENTS

| | | |
|---|---|---|
| 2,386,831 | Wright | Oct. 16, 1945 |
| 2,395,491 | Mavity | Feb. 26, 1946 |
| 2,411,672 | Van den Akker | Nov. 26, 1946 |
| 2,487,574 | Meng | Nov. 8, 1949 |
| 2,509,486 | Danforth | May 30, 1950 |
| 2,519,081 | Skarstrom | Aug. 15, 1950 |
| 2,570,064 | Meinert | Oct. 2, 1951 |
| 2,571,936 | Patterson et al. | Oct. 16, 1951 |
| 2,576,525 | Lipkin | Nov. 27, 1951 |
| 2,599,545 | Egan et al. | June 10, 1952 |
| 2,612,608 | Miller | Sept. 30, 1953 |

OTHER REFERENCES

Strain: "Chromatographic Adsorption Analysis," Interscience Publishers Corp., New York, N. Y. (1945).

Weber: "Oil and Gas Journal," July 19, 1951, pages 58 and 59.

Cassidy: "Adsorption and Chromatography" (1951), Interscience Publishers Inc., New York, page 138.